US008544761B2

(12) United States Patent
Deivasigamani et al.

(10) Patent No.: US 8,544,761 B2
(45) Date of Patent: Oct. 1, 2013

(54) USER ACTIVATED HOT WATER HEATER AND CONTROL SYSTEM

(75) Inventors: Sridhar Deivasigamani, Peoria, IL (US); Sivaprasad Akasam, Peoria, IL (US)

(73) Assignee: Intellihot, Inc., Galesburg, IL (US)

( * ) Notice: Subject to any disclaimer, the term of this patent is extended or adjusted under 35 U.S.C. 154(b) by 697 days.

(21) Appl. No.: 12/859,251

(22) Filed: Aug. 18, 2010

(65) Prior Publication Data

US 2011/0042470 A1 Feb. 24, 2011

Related U.S. Application Data (60) Provisional application No. 61/234,874, filed on Aug. 18, 2009.

(51) Int. Cl.
*G05D 23/00* (2006.01)
*F16L 53/00* (2006.01)
*F24D 17/00* (2006.01)

(52) U.S. Cl.
USPC ............ 236/20 R; 236/51; 137/335; 237/8 A (58) Field of Classification Search
USPC ........... 236/12.13, 20 R, 51, 93 R; 137/334, 137/335, 337, 340; 237/8 A
See application file for complete search history.

(56) References Cited

U.S. PATENT DOCUMENTS

| 5,829,467 | A | 11/1998 | Spicher |
| 6,892,746 | B2 | 5/2005 | Ford |
| 8,191,513 | B2 * | 6/2012 | Krause et al. ................. 122/415 |
| 2003/0080194 | A1 * | 5/2003 | O'Hara et al. ............. 236/12.12 |
| 2003/0089399 | A1 | 5/2003 | Acker |
| 2004/0065098 | A1 * | 4/2004 | Choi et al. ...................... 62/180 |
| 2005/0022871 | A1 | 2/2005 | Acker |
| 2006/0230772 | A1 | 10/2006 | Wacknov et al. |
| 2007/0114290 | A1 | 5/2007 | Kempf et al. |
| 2008/0265046 | A1 | 10/2008 | Grimes |

* cited by examiner

*Primary Examiner* — Marc Norman
(74) *Attorney, Agent, or Firm* — Tracy Jong Law Firm; Tracy P. Jong; Louis Reale (57) ABSTRACT

The present invention relates to a user activated hot water heater and control system for processing hot water to hot water output locations, e.g. faucet, shower, or the like, such that temperature fluctuations and delays in hot water delivery are reduced. Additionally, the temperature of the hot water delivered is adjusted to a predetermined value determined by a user signature constructed from a potential user physical attributes such as height, weight, and the like. The user activated feature of the present invention will provide an energy savings resulting from the smart, upon demand, activation of internal and/or external recirculation systems. Additionally, in preferred embodiments incorporating tank-less water heaters, the hot water maximum temperature, T(maximum) is dependent on the preference setting or default value of the detected general category user or unique individual user. The user dictated control of hot water heater T(maximum) value will not only further increase energy savings, but additionally provide a safety feature that helps protects heat sensitive people such as children, the elderly and the like from potential water burns.

20 Claims, 7 Drawing Sheets

FIG. 6

USER ACTIVATED HOT WATER HEATER AND CONTROL SYSTEM

RELATED APPLICATIONS AND PRIORITY CLAIM

This nonprovisional application claims priority to U.S. Ser. No. 61/234,874; a provisional application filed on Aug. 18, 2009. This application is incorporated by reference herein in its entirety.

FIELD OF THE INVENTION

This application generally relates to fluid handling; and more particularly to controlling the temperature of water emanating from a hot water heating system at a user location.

BACKGROUND OF THE INVENTION

The method and apparatus associated with supplying and use of hot and cold running water is well known. Generally, for both residential and commercial applications, a municipal water supply line provides the water source wherein both hot and cold water services are derived.

The cold water service provided to a user is typically received directly from the municipal water supply line, bypassing any thermal treatment. This cold water service is considered "cold" regardless of the temperature of the water actually received at the output device (e.g. faucet, shower, washing machine, or the like) when cold water is requested. Hot water, on the other hand, is thermally processed via a hot water heating system (common hot water heating systems utilize: gas or electrically powered hot water tanks, as well as tank-less or on-demand type systems). Delays in obtaining cold water when demanded is rarely considered problematic when compared to preferred instantaneous heated water demands. Cold or unheated water is normally considered cold at its delivered equilibrium temperature, and is abundantly available throughout the water delivery system. Unfortunately, instantaneous heated water demand/delivery problems are well known and common place.

Instantaneous heated water demand/delivery problems typically exist when a user or users is directly interacting with the hot water in a real-time scenario. Examples of such scenarios include: showering, washing hands, shaving, or the like. Requests for hot water where instantaneous hot water is a non-issue include: operating a washing machine, filling a bucket, or the like; in such scenarios, the user is not directly interacting with the hot water flow in a real-time physical manner. In such exemplary demands for hot water, the sensitivity to the cooler water initially drawn when hot water is requested is nonexistent or greatly reduced. The tolerance to such a large water temperature variation is primarily due to the absence of a human user interacting with the requested hot water output; unlike the situation with a washing machine, where the goal is merely to achieve a full tub at the desired final water temperature. Other related issues associated with hot water demands, include: hot water supply line temperature fluctuations, time lag or delay-where a user is consuming (running) water waiting for the water to reach the desired temperature, variations in user preferences related to maximum hot water temperature setting. Additional issues include user burn-safety concerns; such concerns are typically associated with hot water users of reduced mental and/or physical capabilities, as well as toddlers, the elderly, and the like.

Unfortunately, the pre-existing hot water heating systems presently available as an apparatus and/or design do not provide adequate remedies or solutions to the aforementioned hot water demand problems and concerns. Such hot water demand problems, concerns, and limitations, not solved by presently available as an apparatus and/or design, are overcome by the teachings of the present disclosure.

SUMMARY OF THE INVENTION

The present invention relates to a user activated hot water heater and control system for managing hot water parameters and processing conditions to hot water output locations or HWOL, (e.g. faucet, shower, or the like) such that the delay in receiving hot water at the target temperature is minimized. Additionally, in tank-less hot water configurations, the temperature of the hot water delivered is optionally adjusted to a predetermined temperature value T(maximum). Such a predetermined temperature value T(maximum) is typically determined by the height and/or weigh of a potential user, thereby tailoring the hot water temperature to better approximate the requirements or preferences of the user. The T(maximum) value can be specifically programmed for a unique individual user or a default T(maximum) value is selected when a general category user is detected. Detection of a unique individual user or general category user is accomplished via the use of at least one physical attribute sensor. The physical attributes of the potential hot water user detected are primarily based on the user's height, weight, or combinations thereof.

In preferred tank-less embodiments, the water that emanates from the hot water output location is thermally conditioned by a hot water heating system having both an internal and an external circulation loops. The internal recirculation loop's primary function is to get the heating system containing the burner activated and up to a predetermined operating temperature. The external recirculation loop's primary function is to prime the hot water lines with hot water, thereby flushing out the once hot water which has now cooled. Both internal and external recirculation loops help to reduce temperature fluctuations and delays in hot water delivery.

In one embodiment of the present invention, the internal recirculation loop is first activated followed by the automatic activation of the external recirculation loop when a potential hot water user is detected. Attribute detecting sensors are selected and configured to detect physical characteristics or attributes of a potential hot water user such as height, weight, combinations thereof, and the like, thereby creating a user signature. User identifying signatures can be comprised of a single attribute, or combination of user attributes and/or spatiotemporal detection characteristics to better ensure accurate user detection. A signature, based on certain physical characteristics of a user, can be used to detect a unique individual user as well as identifying a user as a member of a general category, such as an adult, child, pet, and the like. A potential hot water user's signature, once detected, would result in the generation of a hot water heater pre-activation signal, followed by a hot water heater pre-activation sequence to facilitate hot water delivery to the user.

In accordance with this invention, and the embodiments thereof, there is provided a user activated hot water heater and control system that can be adapted to both standard tank as well as tank-less type water heater varieties. The tank-less or on-demand water heating type systems, having both internal and external recirculation, are the water heaters of choice and are incorporated in preferred embodiments. Accordingly, it is an object of the present invention to provide a user activated sensing system that is able to detect specific users as well as users of a general category or group (e.g. adults, children, or the like).

It is an object of the present invention to provide a control system capable of managing false triggering by filtering out such detections (i.e. the discarding of entities that are not direct hot water users such as pets, insects, and the like).

It is another object of the present invention to provide a user activated sensing system whose sensors are located in the vicinity of hot water output locations (HWOL) where an Instantaneous heated water demand (IHWD) or instant hot water delivery would be appreciated. Such situations are characterized by a user(s) directly interacting with hot water in a real-time fashion.

It is a further object of this invention to provide a user activated hot water heater and control system that is economical from the viewpoint of the manufacturer and consumer, is susceptible of low manufacturing costs with regard to labor and materials, and which accordingly is then susceptible of low prices for the consuming public, thereby making it economically available to the buying public.

Whereas there may be many embodiments of the present invention, each embodiment may meet one or more of the foregoing recited objects in any combination. It is not intended that each embodiment will necessarily meet each objective.

Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

In this respect, before explaining at least one embodiment of the invention in detail, it is to be understood that the invention is not limited in its application to the details of construction and the arrangements of the components set forth in the following description or illustrated in the drawings. The present invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent construction insofar as they do not depart from the spirit and scope of the conception regarded as the present invention.

PARTICULAR ADVANTAGES OF THE INVENTION

The present invention provides users of hot water with several advantages. Preferred embodiments of the present invention utilize both internal and external recirculation systems that are user activated to provide substantially instantaneous hot water delivery upon request. Additionally, preferred embodiments incorporating a temperature based water flow detection system will continue to reliably provide continuous low flow levels of hot water or trickle flow; this is accomplished by the detection of water temperature at least two points in the water delivery system as opposed to the less sensitive method of directly detecting water flow.

The user activated portion of the present invention will provide an energy savings resulting from the as needed smart activation of internal and/or external recirculation systems. Additionally, in preferred embodiments incorporating tankless water heaters, the hot water maximum temperature, T(maximum) is dependent on the preference setting or default value of the detected general category user or unique individual user. The user-dictated control of hot water heater T(maximum) value will not only further increase energy savings, but additionally provide a safety feature that helps protects heat sensitive people such as children, the elderly and the like from potential water burns.

BRIEF DESCRIPTION OF THE DRAWINGS

The invention will be described by reference to the specification and the drawings, in which like numerals refer to like elements, and wherein.

The drawings are not to scale, in fact, some aspects have been emphasized for a better illustration and understanding of the written description.

SPECIFICATION TERM DEFINITIONS AND CONVENTIONS USED

The user activated hot water heater and control system discussed throughout this disclosure shall have equivalent nomenclature, including: the system, the device, the apparatus, the present invention, or the invention. Additionally, the term "exemplary" shall possess a single meaning; wherein the sole definition pertains to serving as an example, instance, or illustration.

In order to help facilitate the understanding of this disclosure, a parts/features list numbering convention has been employed. The first digit in three digit part numbers refers to the Figure number where the part was first introduced, or is best depicted. Likewise, in four digit part numbers, the first two digits refer to the Figure number where the part was first introduced, or is best depicted. Although this disclosure may at times deviate from this convention, it is the intention of this numbering convention to assist in an expeditious comprehension of this application.

PARTS/FEATURES LIST 100. tank-less hot water system with internal recirculation loop
102. tank-less hot water heater
104. heating system
106. heat exchanger
108. blower
110. burner
112. water outlet
114. T(water outlet), Tout
116. recirculation pump
118. buffer tank
120. T(heat exchanger), Thex
122. T(recirculation), Trec
124. flow sensor
126. water inlet
128. internal recirculation flow
130. solenoid valve
132. check valve
134. internal recirculation loop
200. tank-less hot water system with internal and external recirculation loops
202. external check valve
204. external recirculation flow
206. external recirculation loop
300. exemplary flow chart (showing present invention being activated by a child user)
302. physical attribute sensor(s) (detection of a potential user)
304. potential user identified (as a child user by signature comparison by electronic control unit (ECU))
306. ECU (generates proper pre-activation signal for a child)
308. pre-activation sequence initiated (based on pre-activation signal instructions)
310. hot water timely provided (for child user not exceeding predetermined T(maximum) for a child
400. exemplary block diagram of a user activated hot water control system
402. interface, function includes data input means for ECU
404. ECU
406. physical attribute sensor(s)
408. hot water heater (tank-less)
410. signal receiver for hot water heater
412. hot water heater system controller
414. pre-activation signal
416. hot water heater pre-activation sequence
500. exemplary user signature detection using four height zones, general category user identification scheme used
520. exemplary height attribute based user signatures
540. exemplary height-weight attribute signatures
600. exemplary user signature detection using four height zones, unique individual user identification scheme used

DETAILED DESCRIPTION

In the following description, several embodiments are introduced relating to a user activated hot water heater and control system of the present invention. In describing the embodiments illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose.

In this context, the user activated hot water heater and control system, more specifically, the sensors used to detect physical attributes of a specific user or a particular classification of user can be accomplished by a variety of sensor types having appropriate, well known, supporting infrastructure. Such sensor systems available include, but not limited to: heat (IR) sensors, strain gauge or pressure sensing type sensors for weight estimation, light or laser based sensors, proximity sensors (e.g. capacitance based), vibration sensors, ultrasonic sensors, simple switch type, or any combination thereof. The aforementioned sensors or sensor systems can be either passive or active. In preferred embodiments, a sensing system will provide a reliable, safe, non-obtrusive hardware and associated methods of detection. Additionally, relatively inexpensive, easily installed sensing systems are considered desirable sensing system attributes.

It is understood that many of the aforementioned sensing systems can be designed to decipher motion via a time varying analysis of the parameter being detected. For example, a pressure type sensor, such as a strain gauge, (to estimate weight) can be used to detect motion by including supporting logic capable of detecting a weight bearing object, quickly followed by a release. Such a signature may be interpreted as a user's footstep. The detection of such motion is considered an integral part of the ECU logic cooperating with associated user physical attribute sensor(s).

Figure 1:
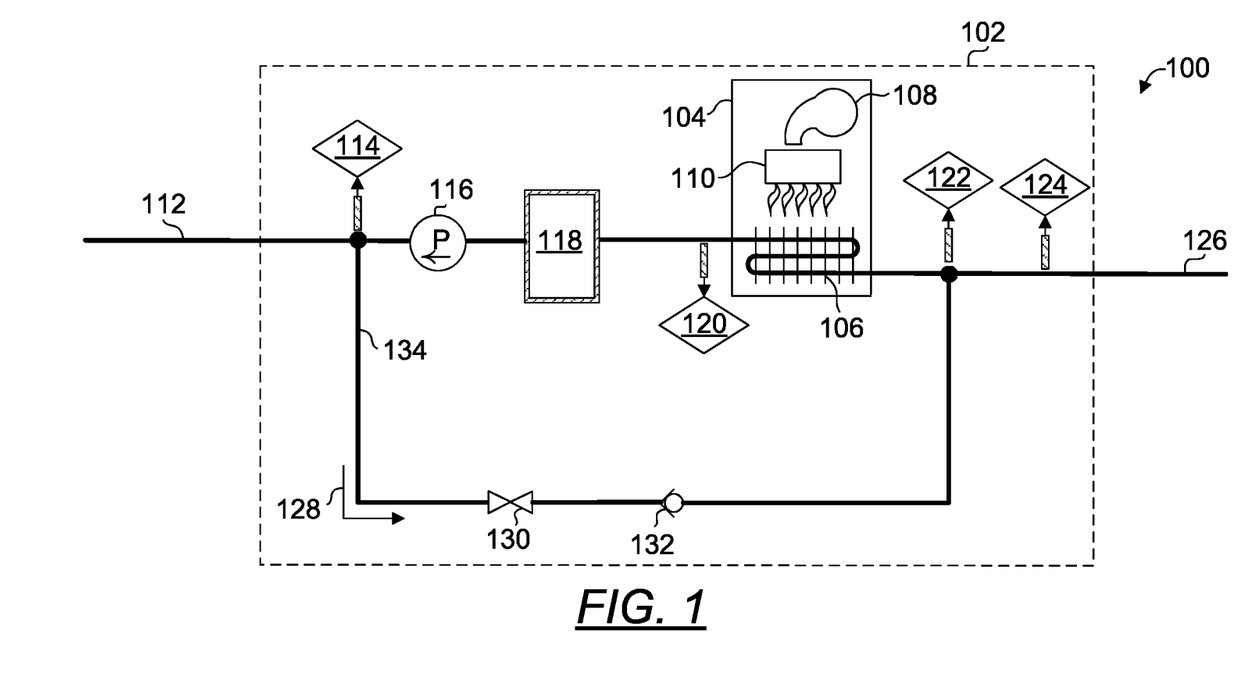
FIG. 1 illustrates a schematic diagram of a preferred tankless hot water system having an internal recirculation loop and a temperature based water flow detection system.
Figure 2:
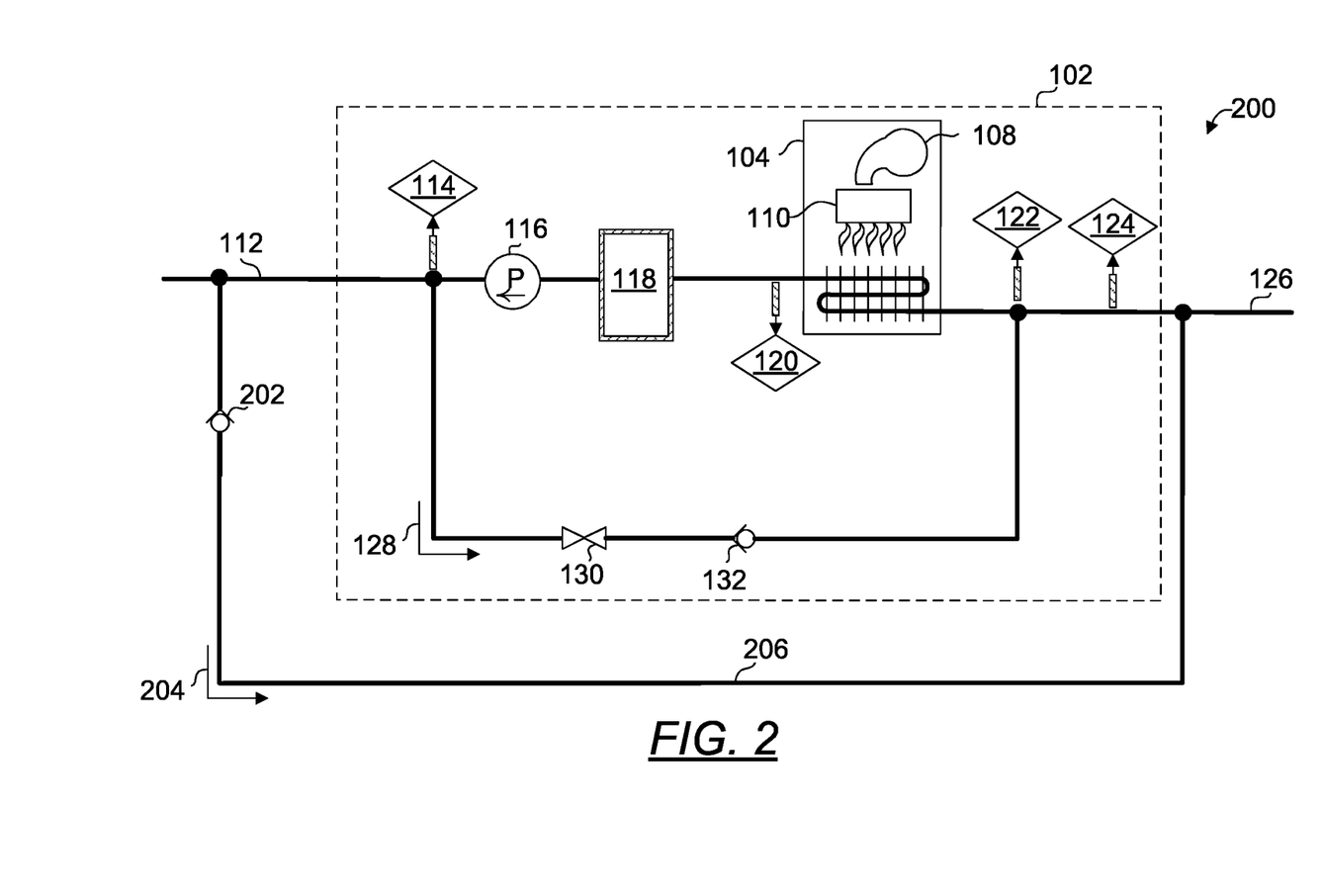
FIG. 2 illustrates a schematic diagram of a preferred tankless hot water system having both an internal and an external recirculation loop and a temperature based water flow detection system

FIG. 1 depicts a tank-less hot water system with internal recirculation loop 100. FIG. 2 depicts a tank-less hot water system having both an internal and an external recirculation loop 200. Both systems depicted in FIGS. 1 and 2 possess internal recirculation loop supporting components that enable internal recirculation flow 128. Supporting components include recirculation pump 116, solenoid valve 130, check valve 132, heating system 104, buffer tank 118, and flow sensor 124. Heating system 104 is comprised of blower 108, burner 110, and heat exchanger 106. Referring to FIG. 2, external recirculation loop supporting components comprise external check valve 202 and external recirculation loop that enables external recirculation flow 204 through tank-less hot water system 200.

Both systems depicted in FIGS. 1 and 2 possess temperature based water flow detection systems and supporting temperature sensing apparatus which provide: T(water outlet), Tout 114, T(heat exchanger) or Thex 120, and T(recirculation) or Trec 122. The temperature based water flow detection system is capable of detecting low flow or trickle flow conditions that typical flow sensors 124 cannot easily detect, a typical trickle flow situation occurs during shaving, where a hot low water flow is desired. The temperature based water flow detection system is primarily based on detecting a thermal differential between at least two points having heat exchanger 106 residing between said two points. Exemplary two points include Tout 114 and Trec 122 as well as Thex 120 and Trec 122 as depicted in FIG. 1 and FIG. 2.

The aforementioned configurations, corresponding detection systems, and the like, discussed and related to systems depicted in FIGS. 1 and 2 as well as similar embodiments are further disclosed in U.S. Patent Application Publication 2010/0195991 published on Aug. 5, 2010. U.S. Patent Application Publication 2010/0195991 is incorporated in its entirety herein by reference.

Referring again to FIG. 1, tank-less hot water heater 102 possesses a water inlet 126 that is typically connected to a municipal water supply, well water, or the like. Hot water exits hot water heater 102 via water outlet 112. Tank-less hot water heater 102 possesses an internal recirculation loop 134; the loop provides a relatively short closed loop water circulation path located within tank-less hot water heater 102 enclosure. In one respect, internal recirculation loop 134 acts as a buffer to the larger external recirculation loop 206 of FIG.

2. A water heater pre-activation sequence is activated by a potential hot water user as delineated in the flow diagram of FIG. 3. The water heater pre-activation sequence is dependent on the water heater's configuration with possible types of activations including activating internal recirculation flow 128 and/or activating external recirculation flow, as well as setting the maximum allowable hot water temperature T(maximum), where T(maximum) corresponds to a predetermined maximum temperature level associated with the type of potential user detected (e.g. child, adult, and so forth).

FIG. 2 illustrates a schematic diagram of a preferred tankless hot water system 200 including an external recirculation loop 206. A typical launch sequence activated by a potential child hot water user is depicted in the exemplary flow chart 300 of FIG. 3 wherein internal recirculation flow 128 is activated. Once the water comprising internal recirculation flow 128 reaches the predetermined temperature, external recirculation flow 204 subsequently activates, thereby substantially preheating the remainder of the targeted plumbing system to the same predetermined temperature. Regarding the systems depicted in FIGS. 1 and 2, the incorporation of a temperature based water flow detection system will reliably provide continuous low flow levels of hot water or trickle flow. Temperature based water flow detection is accomplished by measuring water temperature at least two points in the water delivery system as opposed to the less sensitive method of directly detecting water flow presently practiced today. Additionally, the novel user activated portion of the present invention will provide an energy savings resulting from the as needed smart activation of internal and/or external recirculation systems as well as providing a safety feature that helps protects heat sensitive hot water users such as children, the elderly and the like from potential water burns by the real-time adjustment of T(maximum).

Figure 3:
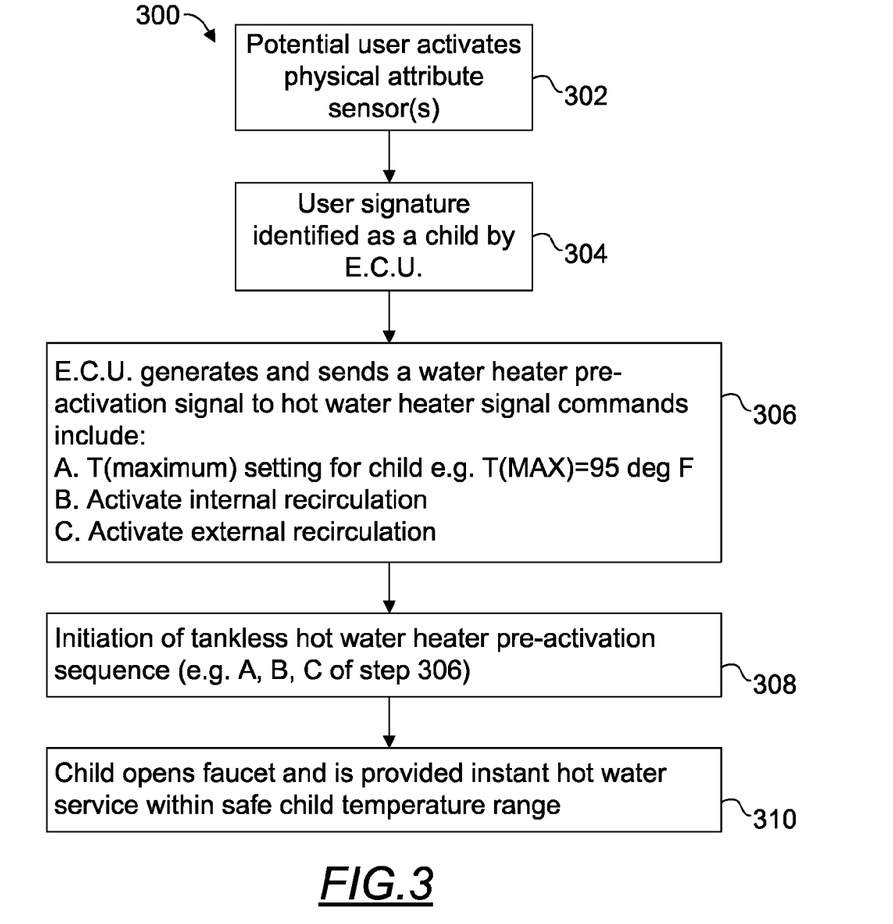
FIG. 3 illustrates an exemplary flowchart delineating the triggering of a user activated hot water heater and control system where the potential hot water user is a child.

FIG. 3 illustrates exemplary flow chart 300 using the tankless hot water heater depicted in FIG. 2 or the like, having both an internal and an external circulation loops. A user activated hot water control system is adapted to the hot water heater, wherein the user, which in this case is a child, generates a water heater pre-activation signal when a predetermined physical attribute signature of a potential user is detected.

Exemplary flow chart 300 begins with block 302 where the physical attribute sensor(s) are acting upon a potential child user, wherein predetermined physical attributes are such as height and weight are detected. In block 304, the child user's physical attribute signature is identified by an ECU. In block 306, the ECU sends a pre-activation signal to the water heater, wherein the signal contains information regarding maximum safe temperature for a child T(maximum) value, along with water heater pre-activation sequence (e.g. calling for internal and external recirculation at T(maximum) setting). In block 308 the commands contained in the pre-activation signal are launched by the hot water heater in preparation for the child user. Finally, in block 310, the child user demands hot water; wherein hot water is delivered substantially free from temperature fluctuations and/or delays; wherein delays are measured from the moment of hot water demand, e.g. turning on the faucet, to the point of receiving hot water at the predetermined target temperature.

Figure 4:
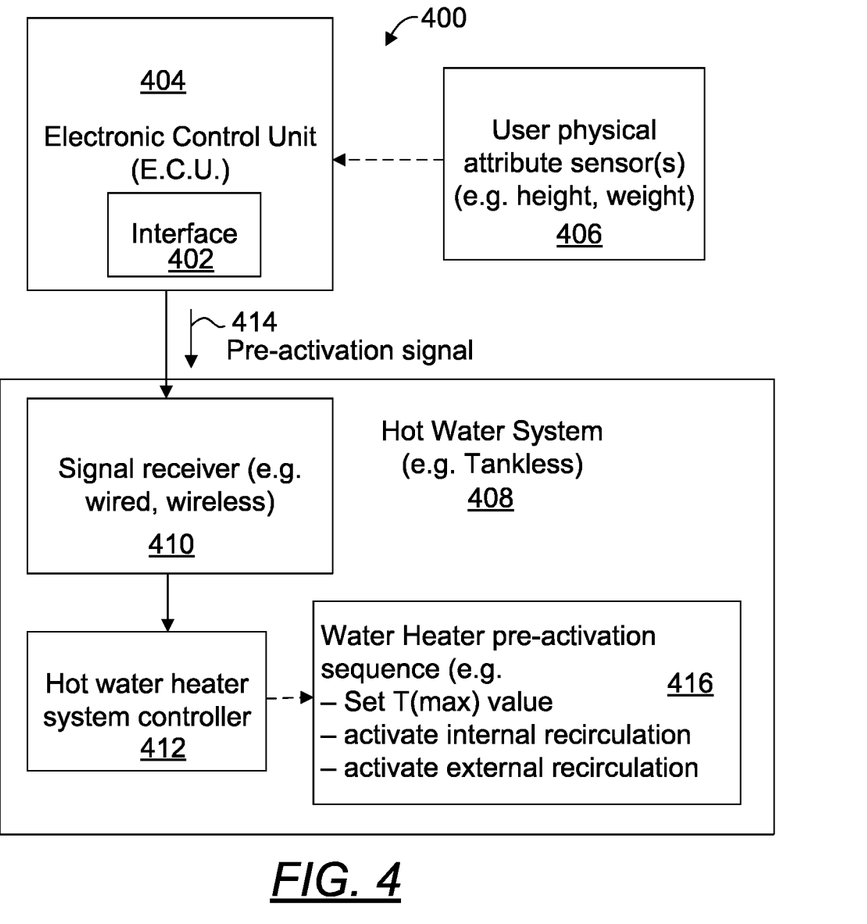
FIG. 4 depicts a general block diagram showing basic signal logic relationships among the electronic control unit, the physical attribute sensor(s), and the hot water system.

FIG. 4 illustrates a general block diagram 400 showing a user activated hot water control system and its cooperative relationship to a tankless hot water system. Contained within ECU 404, for exemplary purposes, is interface 402. Interface 402 provides a data input means to electronic control unit 404. Inputted data can replace and/or supplement pre-existing default data present. Exemplary input data includes: range values defined in zones 1 through 4 shown in FIG. 5 and FIG. 6; height values of users 1 through user 4 depicted in FIG. 6, T(maximum) settings, and the like. Other parameters that are controllable or adjustable such as: sampling rate of the sensor (s), sensitivity adjustments, component calibration, and the like, are accessible via interface 402. Although not so limited, a touch screen type interface 402 offers many advantages to the user and is a preferred embodiment.

Electronic control unit 404 performs several signal based tasks including comparisons between inputted or default values and sensor(s) measured values, for user signature comparison; management of control and driving signals to both physical attribute sensor(s) 406, as well as signal receiver 410 for hot water system 408. In summary, the Electronic control unit 404 behaves like a controlling computer system comprised of RAM and ROM type memory, a CPU, an interface, an operating system, and the like. The methods and associated hardware for detecting and comparing sensor signals, along with activating signal controllable mechanisms such as blowers, burners, and valves is a well known, mature technology and implementation would not present an undue burden to those versed in the art. Such conventional techniques are disclosed in U.S. Pat. Nos. 5,829,467 and 6,892,746, which are incorporated in their entirety herein by reference.

In one embodiment, once a physical attribute signature is identified and confirmed by electronic control unit 404, the unit sends a pre-activation signal 414 to signal receiver 410 that functions as a signal interface for hot water heater 408. It is understood that a pre-activation signal 414 can be transmitted using a hard wired connection as well via a wireless means. The pre-activation signal 414 containing hot water heater 408 specific information (e.g. maximum safe temperature T(maximum) for detected user, water heater pre-activation sequence—internal and external recirculation parameters) received by signal receiver 410 is then processed and commands corresponding to the specific information are delivered to hot water heater system controller 412. In other embodiments, the storage of maximum safe temperature T(maximum) and the like, can reside within hot water heater 408. These commands are incorporated in the pre-activation sequence launched by the hot water heater to prepare for hot water delivery.

The typical steps a user activated tank-less hot water system would go through begins with detecting a potential user and generating a physical attribute signature corresponding to the potential user. The step is then followed by comparing and selecting the user's generated physical attribute signature to a user signature data base, and selecting a best match user signature that best aligns with the user's physical attributes. At this point, the system retrieves a hot water pre-activation sequence corresponding to the best match or closest user signature. Finally, the last step involves activating the hot water pre-activation sequence for the user activated tank-less hot water system, wherein temperature fluctuations and delays in hot water delivery are reduced.

Physical attribute sensor(s) 406 is comprised of at least one sensor capable of detecting and measuring at least one physical attribute of a potential hot water user. The use of more than one sensor has advantages, e.g. reduction is false triggering, and is therefore a preferred embodiment. Available sensors include: heat (IR) sensors, pressure (weight) sensors, light or laser based sensors, proximity sensors (e.g. capacitance based), vibration sensors, ultrasonic sensors, or any combination thereof. In preferred embodiments, a sensing system will provide a reliable, safe, non-obtrusive, hardware and associated methods of detection. Additionally, relatively inexpensive, easily installed sensing systems are considered desirable attributes of preferred embodiments. Most of the aforementioned sensing systems can be designed to decipher motion as well as distance via the analysis of the parameter being detected. One such preferred sensor is the ultrasonic based sensing system. The following is an excerpt from a published lecture available from Brown University of Providence, R.I., reviewing the fundamentals of ultrasonic sensing.

Ultrasonic Acoustic Sensing

Ultrasonic sensors are often used in robots for obstacle avoidance, navigation and map building. Much of the early work was based on a device developed by Polaroid for camera range finding. From the Hitechnic Ultrasonic Sensor web page we learn that their "ultrasonic range sensor works by emitting a short burst of 40 kHz ultrasonic sound from a piezoelectric transducer. A small amount of sound energy is reflected by objects in front of the device and returned to the detector, another piezoelectric transducer. The receiver amplifier sends these reflected signals (echoes) to [a] microcontroller which times them to determine how far away the objects are, by using the speed of sound in air. The calculated range is then converted to a constant current signal and sent to the RCX." The Hitechnic sensor is different from the Polaroid sensor in that it has separate transmitter and receiver components while the Polaroid sensor combines both in a single piezoelectric transceiver; however, the basic operation is the same in both devices.

There are a number of complications involved in interpreting the time-of-flight information returned by an ultrasonic sensor. If the sensor face is parallel to the surface of the nearest object and that surface is flat, reflective and relatively large, e.g., a plaster wall, then the information returned by the sensor can be reasonably interpreted as the distance to the nearest object in front of the sensor. However if the object deviates significantly from this ideal object, the time-of-flight information can be misleading. Here is one of the more benign sorts of interpretation error caused by the fact that the signal (corresponding to a propagating wave of acoustic energy) spreads as it propagates further from the sensor with most of the energy of the leading edge confined to a 30 degree cone. If the surface is angled with respect to the face of the sensor (as it is below) then the time of flight information will record the distance to nearest point within the 30-degree cone. (End of quote)

Figure 5:
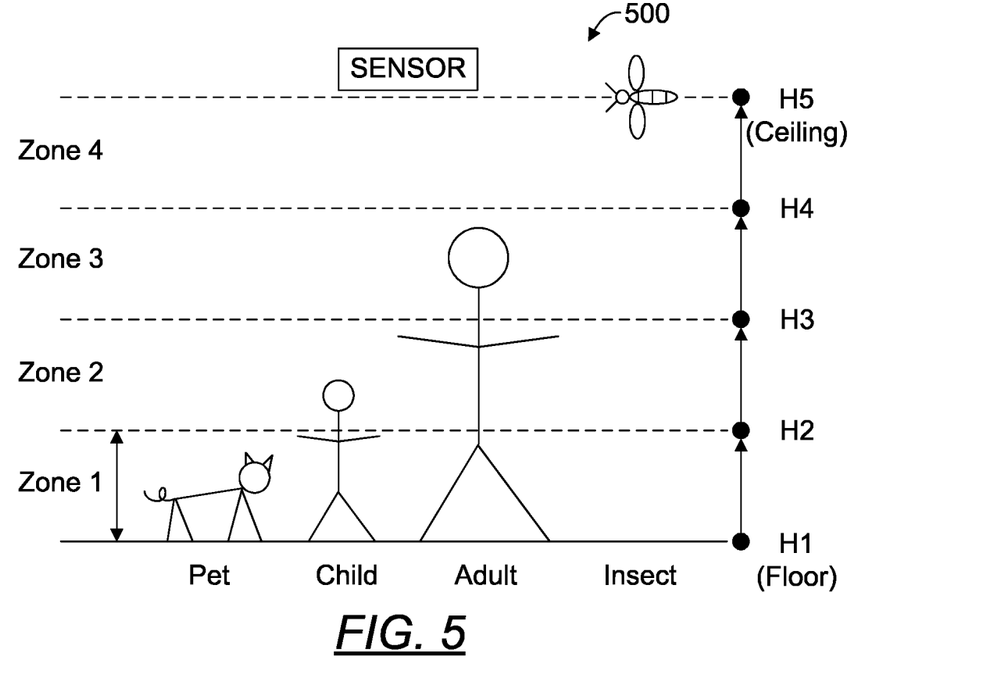
FIG. 5 illustrates a height detecting zone chart showing an example of a default user detection scheme for a user activated hot water heater system.
Figure 5A:
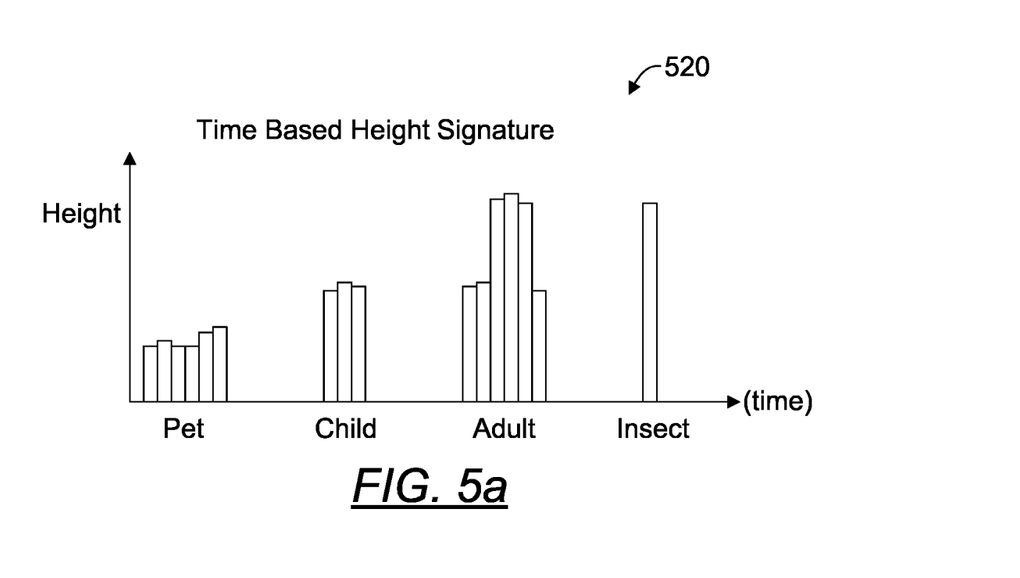
FIG. 5a illustrates an exemplary graph containing time based height signatures for various triggering entities (pet, child, adult, and insect).
Figure 6:
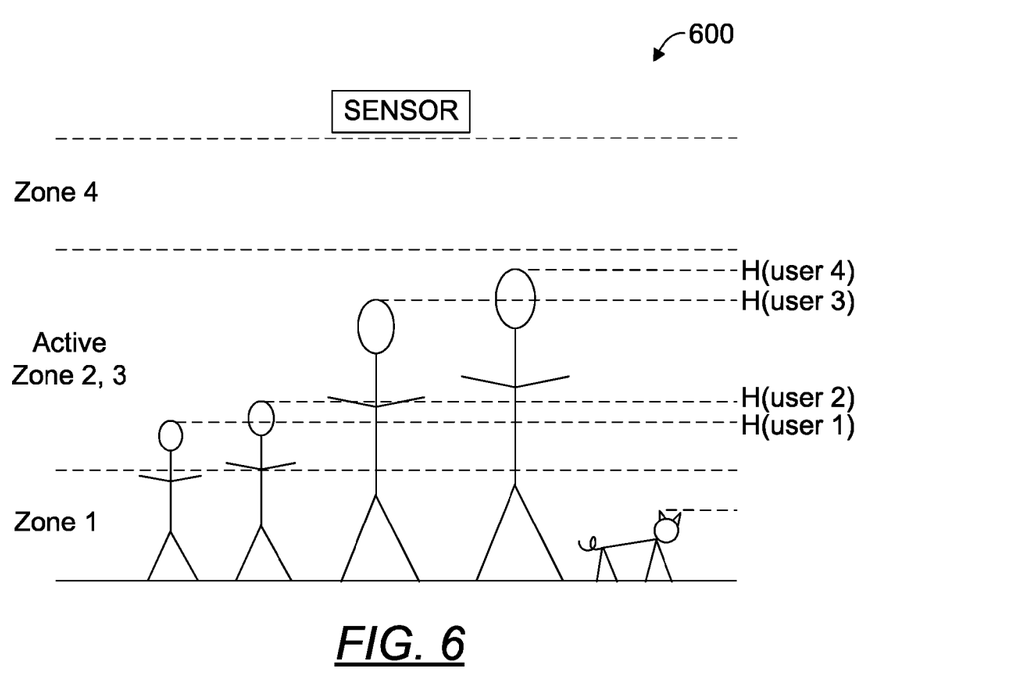
FIG. 6 illustrates a height detecting zone chart showing one example of a user identification scheme for identifying unique individual users.

Referring again to FIG. 4, the exemplary ultrasonic sensor based sensing system is clearly able to decipher motion as well as distance or height via the analysis of the acoustic transmissions and subsequent reflections through air. Such a system provides a time based height signature that is able to detect scanned entities or potential hot water users that possess different physical attributes as depicted in FIGS. 5 and 6. Electronic control unit 404 is configured to detect various types of hot water users either as a unique individual user, a general category user, or any combination thereof; the detection of nonusers such as pets and the like, will be discarded by the system. Exemplary entities, depicted in FIG. 5 include a pet, child, adult, and an insect and their corresponding respective time based height signatures are depicted in FIG. 5*a*. Electronic control unit 404, electronic control unit interface 402, and physical attribute sensor(s) 406 cooperate such that detected entity or a potential user are properly classified via a physical attribute signature. Again, the methods and associated hardware for detecting and comparing sensor signals, along with activating signal controllable mechanisms such as blowers, burners, and valves is a well known, mature technology and implementation would not present an undue burden to those versed in the art.

Referring to FIG. 5, chart 500 depicts an exemplary signature detection scheme where four height zones or general category provide the basis for user categorization. The right and left vertical axes are defined as follows:

Zone 1: The height detection range that includes all entities whose detected height is below height value H2 and greater than or equal to height value H1 (floor level). Exemplary entities included in this zone include: pets, toddlers, and the like.

Zone 2: The height detection range that includes all entities whose detected height is below height value H3 and greater than or equal to height value H2. Exemplary entities included in this zone include: children, walking toddlers, and the like.

Zone 3: The height detection range that includes all entities whose detected height is below height value H4 and greater than or equal to height value H3. Exemplary entities included in this zone include: adults.

Zone 4: The height detection range that includes all entities whose detected height is greater than height value H4. Exemplary entities included in this zone include: unusually tall adults, false triggering by birds, insects, and the like.

Exemplary system responses resulting from various entity signatures based on the time based height signatures are depicted in FIG. 5*a*.

A pet is categorized as a zone 1 entity. The corresponding signal or signature is classified as a false trigger, and is therefore disregarded by hot water system 408.

A child is categorized as a zone 2 entity. The corresponding signal is classified as a heat sensitive user and hot water system 408 initiates hot water pre-activation sequence configured for a child hot water user. Maximum temperature will be automatically set to a predetermined child safe value (e.g. 100 degrees F.) to prevent burns.

An adult is categorized as a zone 3 entity. The corresponding signal is classified as an adult user and hot water system 408 initiates preheating cycle anticipating hot water usage. Maximum temperature will be automatically set to a predetermined adult value (e.g. 120 degrees F.) to align with adult expectations.

An insect is categorized as a zone 4 entity. The corresponding signal is classified as a false trigger and is therefore disregarded by hot water system 408.

Figure 5B:
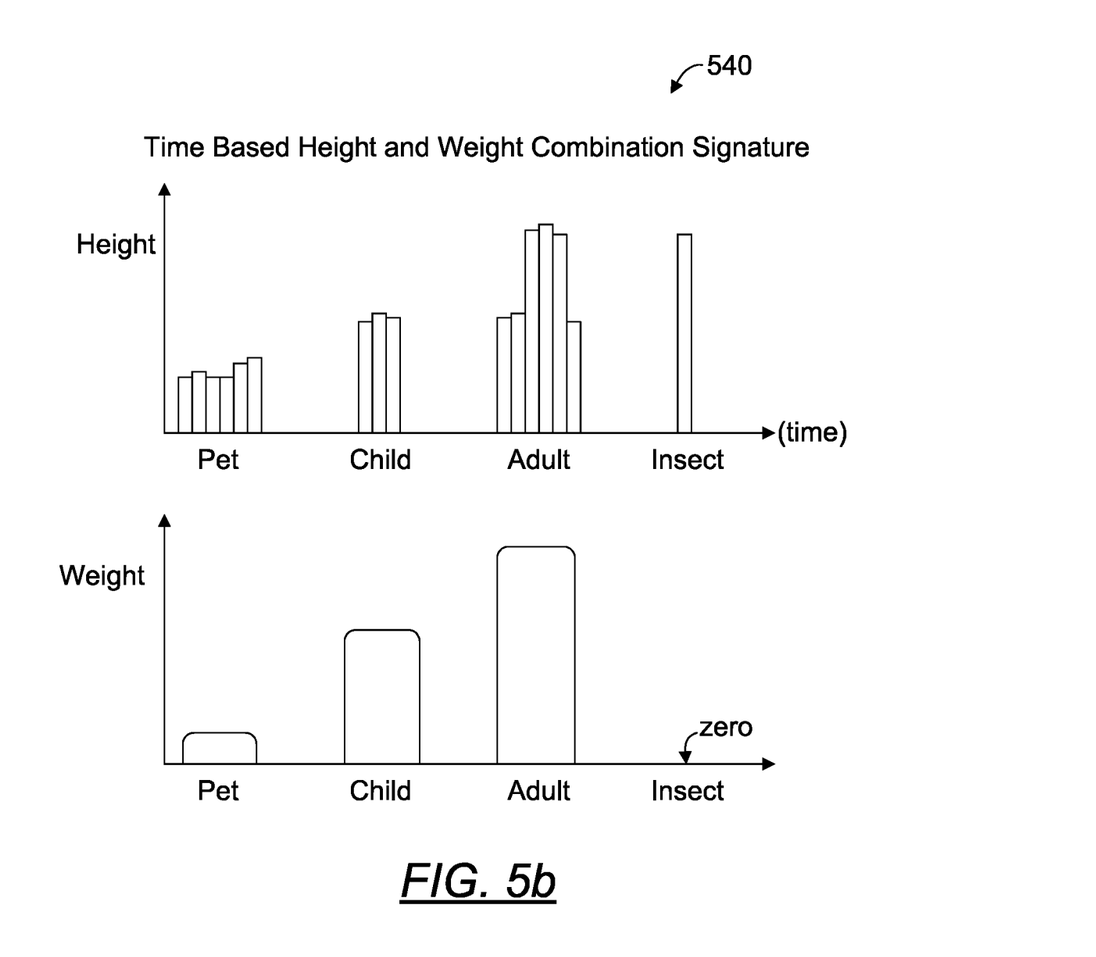
FIG. 5b illustrates exemplary time based signatures containing both height and weight attributes for various triggering entities (pet, child, adult, and insect).

Referring to diagram 540 depicted in FIG. 5*b*, the exemplary signature detection scheme is comprised of four time based height signatures coupled with the corresponding mass or weight attribute of the detected entity. This multi-attribute sensing scheme provides a detection system that possesses superior false triggering discernment. For example, a pet bird, even if falsely identified as a potential hot water user by a height sensor, will not result in a hot water system false trigger due to collaborating weight sensor (e.g. strain gauge placed under carpet directly below height sensor) not detecting a weight signature that aligns with values expected from typical hot water users.

FIG. 6 illustrates a motion-height detecting zone chart 600. Depicted is an identification scheme that detects a unique individual user via time based height signature. The depiction differs from that of FIG. 5 in that classification scheme of FIG. 5 is directed to placement of the detected user into general category. Unique individual users are labeled as H(user 1) to H(user 4). In an exemplary set up, hot water system 408 can provide a personalized maximum water temperature T(maximum) response output for each specific user. A learning step or procedure to input the unique individual preferences such as height signature and T(maximum) into ECU 404 would be accomplished via electronic control unit interface 402, or the like. A system is capable of such personalized recognition can be used to align special hot water requirements or preferences to accommodate special circumstances; e.g. an elderly adult concerned with possible burns, due to feeling loss, can possess a lower T(maximum) system setting.

What is claimed herein is:

1. A user activated hot water control system adapted to a hot water heater, wherein said user activated hot water control system generates a water heater pre-activation signal when a predetermined physical attribute signature of a potential user is detected;
said user activated hot water control system, comprising: at least one user physical attribute sensor, operably connected to an electronic control unit, such that said electronic control unit generates said water heater pre-activation signal when said predetermined physical attribute signature is detected by said least one user physical attribute sensor whereby said hot water heater, receiving said pre-activation signal, initiates a water heater pre-activation sequence designed to forewarn said hot water heater of a likely hot water request, wherein temperature fluctuations and delays in hot water delivery are reduced.

2. The user activated hot water control system of claim 1, wherein said hot water heater is a tank-less type water heater.

3. The user activated hot water control system of claim 2, wherein said electronic control unit provides a means for storing a plurality of predetermined physical attribute signatures, further comprising a means for associating each said potential user with a predetermined T(maximum) value such that said predetermined T(maximum) value provides an upper level temperature constraint for said tank-less type water heater.

4. The user activated hot water control system of claim 3, wherein said potential user further comprises a unique individual user, a general category user, or any combination thereof.

5. The user activated hot water control system of claim 1, wherein said at least one user physical attribute sensor is selected from the group consisting of height sensors, weight sensors, and any combination thereof.

6. A user activated tank-less hot water system wherein a predetermined physical attribute signature associated with a potential user, initiates a tank-less hot water pre-activation sequence;
said user activated tank-less hot water system, comprising: a tank-less hot water heating system operably connected to a user activated hot water control system, said user activated hot water control system further comprises at least one user physical attribute sensor, operably connected to said electronic control unit, such that said electronic control unit generates a tank-less hot water pre-activation signal when said predetermined physical attribute signature is detected by at least one user physical attribute sensor whereby said tank-less hot water, receiving said pre-activation signal, initiates a water heater pre-activation sequence wherein temperature fluctuations and delays in hot water delivery are reduced.

7. The user activated hot water control system of claim 6, wherein said at least one user physical attribute sensor is selected from the group consisting of height sensors, weight sensors, and any combination thereof.

8. The user activated tank-less hot water system of claim 6, wherein said hot water heater further comprises an internal recirculation loop having a temperature based water flow detection system.

9. The user activated tank-less hot water system of claim 8, wherein said hot water heater further comprises an external recirculation loop.

10. The user activated hot water control system of claim 9, wherein said water heater pre-activation sequence further comprising an internal recirculation flow through said internal recirculation loop, and an external recirculation flow through said external recirculation loop.

11. The user activated hot water control system of claim 9, wherein said electronic control unit provides a means for storing a plurality of predetermined physical attribute signatures, further comprising a means for associating said potential user with a predetermined T(maximum) value such that said predetermined T(maximum) value provides an upper level temperature constraint for said tank-less type water heater.

12. The user activated hot water control system of claim 11, wherein said water heater pre-activation sequence further comprising an internal recirculation flow through said internal recirculation loop, and an external recirculation flow through said external recirculation loop.

13. The user activated hot water control system of claim 8, wherein said water heater pre-activation sequence further comprising an internal recirculation flow through said internal recirculation loop.

14. The user activated hot water control system of claim 8, wherein said electronic control unit provides a means for storing a plurality of predetermined physical attribute signatures, further comprising a means for associating said potential user with a predetermined T(maximum) value such that said predetermined T(maximum) value provides an upper level temperature constraint for said tank-less type water heater.

15. The user activated hot water control system of claim 14, wherein said water heater pre-activation sequence further comprising an internal recirculation flow through said internal recirculation loop.

16. The user activated hot water control system of claim 6, wherein said electronic control unit provides a means for storing a plurality of predetermined physical attribute signatures, further comprising a means for associating said potential user with a predetermined T(maximum) value such that said predetermined T(maximum) value provides an upper level temperature constraint for said tank-less type water heater.

17. The user activated hot water control system of claim 16, wherein said water heater pre-activation sequence further comprising an internal recirculation flow through an internal recirculation loop.

18. The user activated hot water control system of claim 17, wherein said water heater pre-activation sequence further comprising an internal recirculation flow through said internal recirculation loop, and an external recirculation flow through an external recirculation loop.

19. The user activated hot water control system of claim 6, wherein said potential user further comprises a unique individual user, a general category user, or any combination thereof.

20. A user activated tank-less hot water system, wherein a predetermined physical attribute signature associated with a potential user, initiates a tank-less hot water pre-activation sequence;
said user activated tank-less hot water system, comprising a means for:
a. detecting a potential user;
b. generating a physical attribute signature corresponding to said potential user;

c. comparing and selecting said physical attribute signature to a user signature data base, and selecting a best match user signature;
d. retrieving a hot water pre-activation sequence corresponding to said best match user signature; and
e. activating said hot water pre-activation sequence for said user activated tank-less hot water system, wherein temperature fluctuations and delays in hot water delivery are reduced.

\* \* \* \* \*